Aug. 10, 1954  J. O. WAGNER  2,685,760
EYE FOR DOLLS
Filed April 9, 1947

JOHN O. WAGNER
INVENTOR.

BY *Nelson J. Edge*

ATTORNEY

Patented Aug. 10, 1954

2,685,760

UNITED STATES PATENT OFFICE 2,685,760

EYE FOR DOLLS

John O. Wagner, Palisade, N. J.

Application April 9, 1947, Serial No. 740,295

2 Claims. (Cl. 46—165)

The present invention relates to an eye for dolls or the like, and refers more particularly to a transparent object suitable for insertion in a doll, manikin, or stuffed animal to represent the eye thereof in a realistic and striking manner.

An object of the present invention is to provide an eye for dolls or the like which shall present a striking appearance of depth, and the appearance of which will change as it is viewed from different angles.

Another object is to provide such advantages in an eye which is cheap to manufacture and easy to affix to the doll or similar body in which it is to be used.

Another object is to provide an eye which will present a gleam when viewed from certain angles.

In accomplishing the objects of the present invention I have provided an eye which has a front portion of preferably parti-spherical shape, and a cylindrical portion of smaller diameter extending rearwardly therefrom and preferably integrally therewith.

In the preferred form of the invention, a truncated conical portion is located between the front portion of the eye and the cylindrical portion, and the rear surfaces of the front portion, intermediate portion, and outside surfaces of the cylindrical portion are suitably tinted or otherwise colored to represent respectively, the eye ball, the iris and the pupil. The forward portion of the cylindrical portion is preferably not colored, but rather highly polished so as to be reflective of light incident thereon from the interior of the eye. This form of the invention gives the most realistic appearance and greatest illusion of depth. The highly polished portion is not visible when the eye is viewed from direct front, but becomes visible as a half moon of increasing thickness as the eye is viewed at an increasing angle of inclination to its axis. This portion is very small, and the appearance it presents is that of a gleam.

A further means of producing the gleam in the eye is by forming, at the junction of the cylindrical and the intermediate portions, an integral collar extending outward somewhat.

Other objects of this invention will in part be obvious and in part hereinafter pointed out. The invention accordingly consists in the features of construction, combinations of elements, and arrangements of parts which will be exemplified in the construction hereinafter described and of which the scope of application will be indicated in the following claims. In the accompanying drawing, in which are shown some of the various possible illustrative embodiments of this invention:

Figure 1:
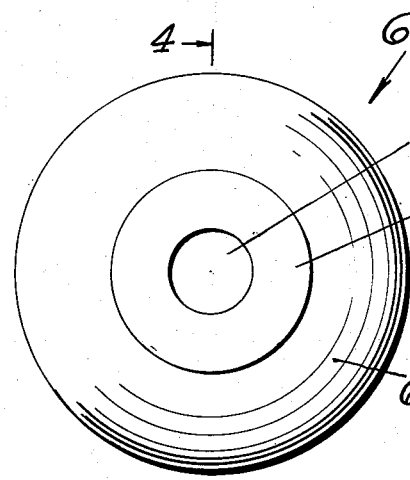
Figure 1 is a front elevational view of one form of the invention.

Referring now more particularly to the drawings, the eye 60 includes the body portion 61, the latter comprising the parti-spherical front surface 62 and the rear surface 63. An intermediate portion 64 is of truncated conical shape, is preferably integral with the body portion 61 and has its base adjacent thereto. A cylindrical portion 65 is preferably integral with the intermediate portion 64 and extends rearwardly from the rear thereof, the portions 61, 64 and 65 all being of transparent material.

The rear surface 63 of body portion 61 is preferably covered with white paint or other white coating material 66 in simulation of the white portion of the eye of a human being when eye 60 is viewed from the front, and the intermediate, conical portion 64 is painted or otherwise covered with the colored coating 67 which may be blue, brown, or other color of a human iris. The cylindrical portion 65 is covered almost completely around its sides and across its back with the coating 68 of paint or other material which is preferably black in simulation of the pupil of a human eye. An annular portion 69 of cylindrical portion 65 adjacent the junction of the portions 64, 65, is preferably left uncovered and is highly polished. The purpose of polishing the surface 69 is to render it reflective of light incident thereon from the interior of the cylindrical portion 65. Of course, the same object could be achieved by coating the surface 69 with a particularly reflective material such as quicksilver.

Figure 2:
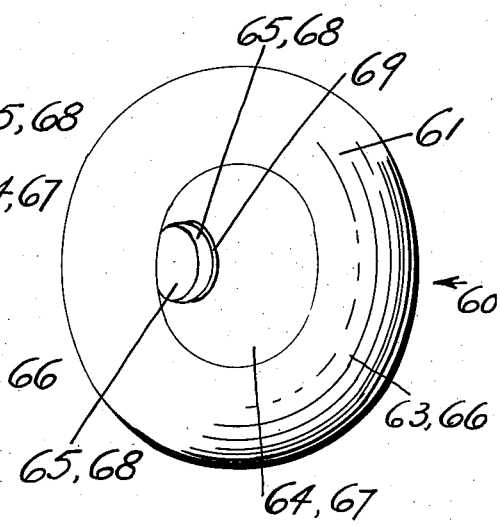
Figure 2 is a front perspective view of the same.
Figure 3:
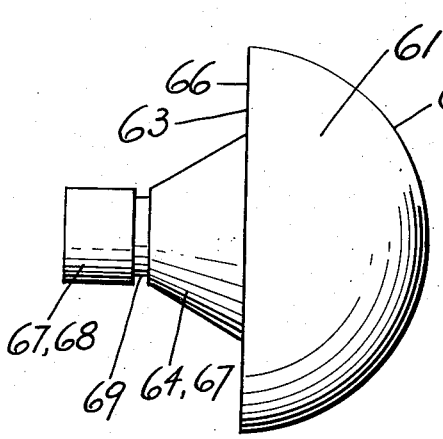
Figure 3 is a side elevational view of the same.
Figure 4:
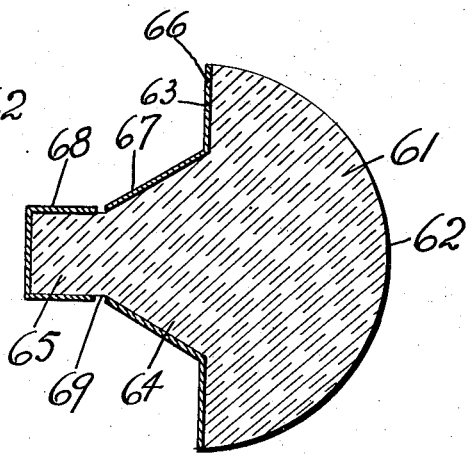
Figure 4 is a sectional view on the line 4—4 of Figure 1.

The portion 69, as most clearly apparent from Figures 3 and 4, is very small compared to the eye 60 in its entirety, and furthermore, being a side surface of the cylindrical portion 65, is not seen when the eye 60 is viewed from the front as in Figure 1. As the angle of view of eye 60 is inclined from the axis of cylindrical portion 65, the surface 69 becomes visible as seen in Figure 2. Being small, and yet highly reflective, the surface 69 is perceived rather as a gleam or glint in eye 60 rather than as a definitely located component having substantial proportions. The portion 69 appears to become brighter as the angle of inclination increases, and diminishes in brilliance as the angle of inclination decreases, until it finally disappears when the eye is viewed head-on.

Figure 5:
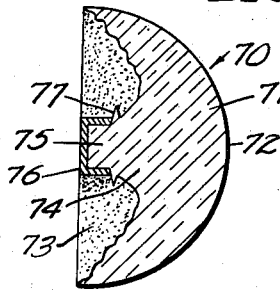
Figure 5 is a similar view of a modified form of the invention.

In Figure 5 is illustrated a modification of the form of the invention illustrated in Figures 1 to 4. Figure 5 is a section along the axis of the cylindrical portion, that is, similar to Figure 4. The eye 70 of Figure 5 comprises the body portion 71 which has a substantially hemispherical front surface 72 and a concave rear surface 73, the rear surface 73 having a greater radius of curvature than the front surface 72. The surface 73 may be roughly finished so that when viewed from the front it presents a pebbled or stippled appearance roughly similar to that of certain animal eyes. Front surface 72 and rear surface 73 converge at an angle of substantially forty five degrees throughout the flat plane of the hemisphere described by the front surface 72 and the left boundary line of Figure 5.

Located with its axis on a radius of the sphere, an intermediate truncated conical portion 74 representing the iris is integral with body portion 71 and has its base located substantially at the rear surface thereof. A substantially cylindrical portion 75 representing the pupil is preferably integral with the intermediate portion 74 and extends rearwardly therefrom and has its rear surface and most of its side surface covered by a black paint 76 or the like. The portions 71, 74, 75 are of transparent material. Light reflecting means in the form of a collar 77 is located at the junction of or situs of merger between intermediate portion 74 and the cylindrical portion 75, and integral with both. Collar 77 is also of transparent material, and when viewed from the front of eye 70, at an angle of inclination to the axis of the portions 74, 75, emits a glint or gleam similar to that produced by the portion 69 of the eye 60.

It will thus be seen that there is provided a device in which the several objects of this invention are achieved, and which is well adapted to meet the conditions of practical use. As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. In an eye for dolls or the like, in combination, a front portion comprising a convex front surface and concave rear surface having a greater radius of curvature than said front surface, an intermediate portion integral with said front portion, said intermediate portion being a truncated cone and having its base adjacent said rear surface, and a cylindrical portion integral with and extending rearwardly from said intermediate portion, all of said portions being of transparent material, said rear surface being roughened so as to present a stippled appearance when said eye is viewed from the front, said cylindrical portion further comprising at the forward portion thereof annular means effective to reflect light incident from the interior of said eye, said means comprising a collar of transparent material integral with said cylindrical portion.

2. In a doll's eye, in combination, a transparent body portion, said portion comprising a front portion, said front portion comprising a convex front surface, said body portion further comprising a truncated cone integral with said front portion and extending rearwardly therefrom, said body portion further comprising a cylindrical portion integral with said cone and extending rearwardly therefrom, said body portion further comprising light reflective means located at the juncture of said cone and said cylindrical portion, said means being effective to reflect light incident thereon from the interior of said body portion.

References Cited in the file of this patent

UNITED STATES PATENTS

| Number | Name | Date |
| --- | --- | --- |
| 543,029 | Leblanc | July 23, 1895 |
| 947,808 | Fisher | Feb. 1, 1910 |
| 1,306,850 | Karabin et al. | June 17, 1919 |
| 1,399,840 | Barnard | Dec. 13, 1921 |
| 1,710,791 | Steiner | Apr. 30, 1929 |
| 2,056,090 | Burris | Sept. 29, 1936 |
| 2,210,799 | Denny | Aug. 6, 1940 |
| 2,254,232 | Marcus | Sept. 2, 1941 |
| 2,254,418 | Carley | Sept. 2, 1941 |
| 2,425,510 | Cohn | Aug. 12, 1947 |
| 2,491,682 | Muhlbach | Dec. 20, 1949 |

FOREIGN PATENTS

| Number | Country | Date |
| --- | --- | --- |
| 13,795 | Great Britain | June 9, 1911 |
| 466,566 | Germany | Oct. 9, 1928 |
| 609,597 | Germany | Feb. 21, 1935 |